United States Patent
Hayakawa et al.

(10) Patent No.: US 10,453,370 B1
(45) Date of Patent: Oct. 22, 2019

(54) CONTROL APPARATUS, OPTICAL SCANNING APPARATUS, DISPLAY APPARATUS, AND CONTROL METHOD

(71) Applicants: Etsuji Hayakawa, Tokyo (JP); Toyoki Tanaka, Tokyo (JP)

(72) Inventors: Etsuji Hayakawa, Tokyo (JP); Toyoki Tanaka, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/391,736

(22) Filed: Apr. 23, 2019

(30) Foreign Application Priority Data

May 15, 2018 (JP) .................. 2018-094039

(51) Int. Cl.
| | |
|---|---|
| G09G 3/00 | (2006.01) |
| G02B 26/10 | (2006.01) |
| G02B 27/00 | (2006.01) |
| G09G 3/20 | (2006.01) |
| G09G 3/02 | (2006.01) |
| G02B 27/02 | (2006.01) |
| H04N 5/64 | (2006.01) |

(52) U.S. Cl.
CPC ............... *G09G 3/20* (2013.01); *G02B 26/10* (2013.01); *G02B 27/02* (2013.01); *G09G 3/02* (2013.01); *H04N 5/64* (2013.01); *G09G 2320/041* (2013.01)

(58) Field of Classification Search
CPC ............ G09G 3/00; G09G 3/02; G09G 3/025; G09G 3/20; G02B 26/02; G02B 26/10; G02B 27/00; G02B 27/104; G02B 27/48; G02B 2006/12121; G02B 2006/12135; G02B 2006/12138

See application file for complete search history.

(56) References Cited

U.S. PATENT DOCUMENTS

| | | | | |
|---|---|---|---|---|
| 2004/0240495 | A1* | 12/2004 | Akamatsu | G03B 21/16 372/32 |
| 2012/0182487 | A1* | 7/2012 | Konno | G02B 27/286 349/7 |
| 2016/0255319 | A1* | 9/2016 | Miyamoto | G02B 27/0101 348/602 |
| 2016/0342076 | A1* | 11/2016 | Katou | H04N 9/3129 |
| 2019/0122635 | A1* | 4/2019 | Kimura | G09G 3/025 |

FOREIGN PATENT DOCUMENTS

JP 2017-194623 10/2017

* cited by examiner

*Primary Examiner* — Thai Pham
(74) *Attorney, Agent, or Firm* — IPUSA, PLLC

(57) ABSTRACT

A control apparatus is used in a display apparatus. The control apparatus includes a laser element; a temperature sensor configured to detect a temperature of the laser element; a laser driver configured to drive the laser element; and a laser control unit configured to control a driving current to be supplied to the laser element by the laser driver, such that an optical output value of the laser element converges to a target optical output value. The laser control unit determines an initial driving current value that causes an initial optical output value to be output from the laser element, based on temperature characteristic data of the initial driving current value, and a detection temperature of the laser element detected by the temperature sensor, and controls the driving current to start from the determined initial driving current value.

15 Claims, 6 Drawing Sheets

CONTROL APPARATUS, OPTICAL SCANNING APPARATUS, DISPLAY APPARATUS, AND CONTROL METHOD

CROSS-REFERENCE TO RELATED APPLICATIONS

This application is based on and claims priority to Japanese Patent Application No. 2018-094039 filed on May 15, 2018, the entire contents of which are incorporated herein by reference.

BACKGROUND OF THE INVENTION

1. Field of the Invention

The present invention relates to a control apparatus, an optical scanning apparatus, a display apparatus, and a control method.

2. Description of the Related Art

Conventionally, in a display apparatus in which a laser element is used as a light source, there is known a technique in which the light that is output from the laser element is monitored by a light receiving element, and the current flowing to the laser element is controlled such that the optical output of the laser element becomes a predetermined output (see, for example, Patent Document 1).

Patent Document 1: Japanese Unexamined Patent Application Publication No. 2017-194623

In a display apparatus using a laser element such as a laser diode (LD) as the light source, when correcting the optical output of the laser element, it is necessary to first oscillate the laser element and output light from the laser element. However, the laser element has a temperature characteristic in which the current value (threshold current value) at which the oscillation is started, and the slope of the optical output (light emission efficiency) relative to the injection current, change depending on the temperature (see FIG. 1).

Therefore, when the laser element starts to be driven at a constant initial driving current value that is determined in advance, the optical output of the laser element will change depending on the temperature (see the arrows in FIG. 1). Thus, when starting to drive the laser element at a fixed initial driving current value, the fixed initial driving current value will be the optimum current value for outputting the desired optical output value at a certain temperature, but at a temperature away from the certain temperature, the difference from the optimum current value will be large.

For example, in the case illustrated in FIG. 2, at 40 degrees Celsius, the initial driving current value fixed at 125 mA is close to the optimum current value for outputting the desired optical output value of 60 mW; however, at temperatures away from 40 degrees Celsius, the difference between the initial driving current value and the optimum current value becomes large.

A large difference between the initial driving current value and the optimum current value means that the difference between the initial optical output value that is output from the laser element immediately after the start of the driving at the initial driving current value and the target optical output value to which the optical output value of the laser element is to converge, is relatively large from the start of the driving of the laser element. Accordingly, it takes a long time for the optical output value of the laser element to converge to the target optical output value, when the driving current flowing to the laser element is started (initiated) from an initial driving current value that causes the laser element to output an initial optical output value having a relatively large difference from the target optical output value.

SUMMARY OF THE INVENTION

Embodiments of the present invention can provide a control apparatus, an optical scanning apparatus, a display apparatus, and a control method that can reduce the time until the optical output value of the laser element converges to the target optical output value, even when the temperature of the laser element changes.

According to one aspect of embodiments of the present invention, there is provided a control apparatus used in a display apparatus, the control apparatus including a laser element; a temperature sensor configured to detect a temperature of the laser element; a laser driver configured to drive the laser element; and a laser control unit configured to control a driving current to be supplied to the laser element by the laser driver, such that an optical output value of the laser element converges to a target optical output value, wherein the laser control unit determines an initial driving current value that causes an initial optical output value to be output from the laser element, based on temperature characteristic data of the initial driving current value, and a detection temperature of the laser element detected by the temperature sensor, and controls the driving current to start from the determined initial driving current value.

Furthermore, according to another aspect of embodiments of the present invention, there is provided an optical scanning apparatus including the control apparatus; and an optical scanning unit configured to scan a laser optical output from the laser element.

Furthermore, according to still another aspect of embodiments of the present invention, there is provided a display apparatus including the optical scanning apparatus; and an optical system configured to project an image based on the laser light scanned by the optical scanning unit.

Furthermore, according to still another aspect of embodiments of the present invention, there is provided a control method for controlling a driving current to be supplied to a laser element, such that an optical output value of the laser element converges to a target optical output value, the control method including determining an initial driving current value, based on temperature characteristic data of the initial driving current value that causes an initial optical output value to be output from the laser element, and a detection temperature of the laser element that is detected; and controlling the driving current to start from the determined initial driving current value.

DESCRIPTION OF THE PREFERRED EMBODIMENTS

Figure 1:
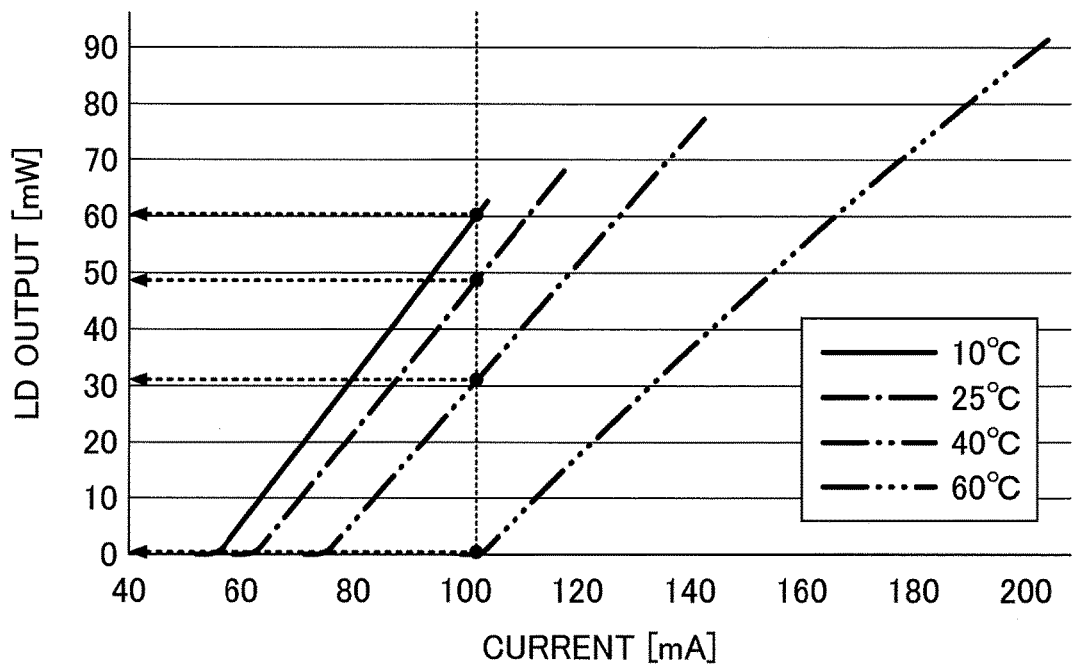
FIG. 1 is a diagram illustrating an example of an optical output characteristic of a laser element with respect to a current flowing through a laser element.

Hereinafter, an embodiment for carrying out the present invention will be described with reference to the drawings. In the respective drawings, the same elements may be denoted by the same reference numerals and duplicate descriptions may be omitted.

Figure 3:
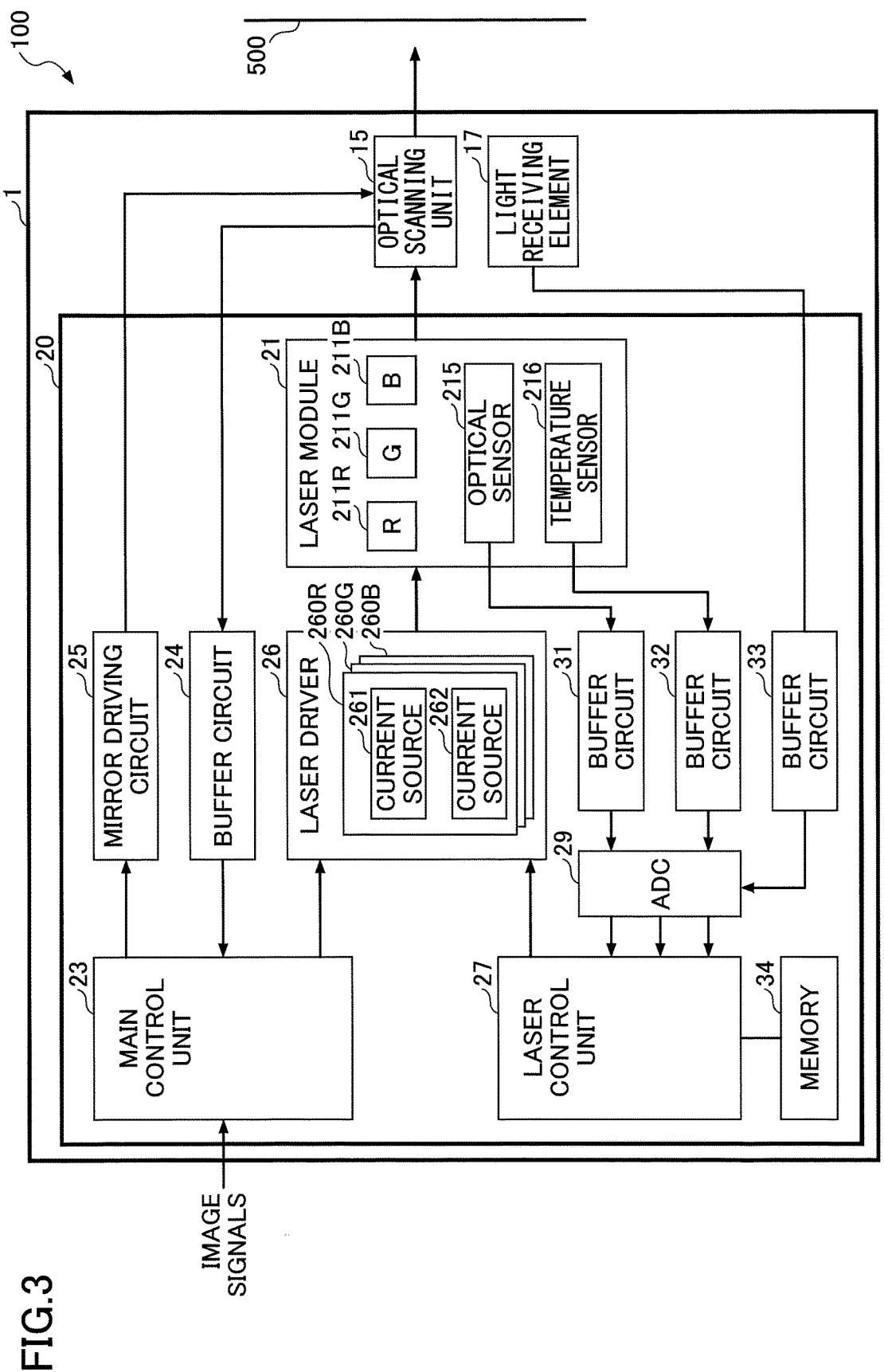
FIG. 3 is a diagram illustrating an example of a configuration of a display apparatus according to an embodiment of the present invention.

FIG. 3 is a diagram illustrating an example of a configuration of a display apparatus according to the present embodiment. A display apparatus 100 illustrated in FIG. 3 is an apparatus for displaying an image corresponding to image signals input from an external source. Examples of the display apparatus 100 include a head-mounted display that projects images directly to the retinas of the user's eyes, a laser projector that displays images on a display surface such as a screen, a head-up display used by being equipped in a vehicle, and the like.

The display apparatus 100 according to the present embodiment includes, for example, an optical scanning apparatus 1 and an optical system 500. The optical scanning apparatus 1 scans, by an optical scanning unit 15, a laser light that is output from a control apparatus 20, and emits the light to the optical system 500.

The optical system 500 is a device for displaying images from incoming laser light scanned by the optical scanning unit 15. The optical system 500 is, for example, an optical unit including lenses and semitransparent mirrors, but may include optical components other than lenses and semitransparent mirrors.

The optical scanning apparatus 1 according to the present embodiment includes, for example, a light receiving element 17, the optical scanning unit 15, and the control apparatus 20.

The light receiving element 17 is an optical sensor that detects the external light around the display apparatus 100 and outputs a current corresponding to the brightness of the external light. For example, a photodiode or the like may be used as the light receiving element 17.

The optical scanning unit 15 scans the incoming laser light in two dimensions, and the scanned laser light is directly projected to a display surface via the optical system 500 to form a two-dimensional image. The optical scanning unit 15 oscillates a mirror to scan the laser light output from the laser element of the control apparatus 20.

The optical scanning unit 15 includes, for example, one mirror that oscillates with respect to two orthogonal axes. The optical scanning unit 15 may be, for example, a MEMS (Micro Electro Medical Systems) made by a semiconductor process or the like. The mirror of the optical scanning unit 15 may be driven, for example, by an actuator driven by a deforming force of a piezoelectric element.

The control apparatus 20 according to the present embodiment includes, for example, a laser module 21, buffer circuits 31 to 33, an ADC (Analog to Digital Converter) 29, a main control unit 23, a buffer circuit 24, a mirror driving circuit 25, a laser driver 26, a laser control unit 27, and a memory 34.

The laser module 21 includes a plurality of laser elements, such as lasers 211R, 211G, and 211B, an optical sensor 215 for monitoring the most recent output light of each of the plurality of laser elements, and a temperature sensor 216 for monitoring the temperature of each of the plurality of laser elements (may be the surrounding temperature).

The lasers 211R, 211G, and 211B emit laser light of optical output corresponding to the current value of the injected current, respectively. The laser 211R is, for example, a red semiconductor laser and can emit light of a wavelength λR (e.g., 640 nm). The laser 211G is, for example, a green semiconductor laser and can emit light of a wavelength λG (e.g., 530 nm). The laser 211B is, for example, a blue semiconductor laser and can emit light of a wavelength λB (e.g., 445 nm). The laser light beams of the respective wavelengths emitted from the lasers 211R, 211G, and 211B are synthesized by a dichroic mirror or the like and the synthesized laser light enters the optical scanning unit 15.

The optical sensor 215 is an element that monitors the most recent light of each of the lasers 211R, 211G, and 211B. The optical sensor 215 detects the optical output of each of the lasers 211R, 211G, and 211B and outputs a current corresponding to the magnitude of the detected optical output. As the optical sensor 215, for example, a light receiving element such as a photodiode may be used. The optical sensor 215 can be positioned at any location at which the optical sensor 215 can detect laser light before the laser light enters the optical scanning unit 15.

When a dimming filter that is a dimming means exists between the laser module 21 and the optical scanning unit 15, the laser light beams of the respective wavelengths emitted from the lasers 211R, 211G, and 211B are synthesized by a dichroic mirror or the like and the synthesized laser light enters the dimming filter. The optical sensor 215 can be positioned at any location at which the optical sensor 215 can detect the laser light before being transmitted to the dimming filter.

The temperature sensor 216 is an element that monitors the temperature of each of lasers 211R, 211G, and 211B. The temperature sensor 216 detects the temperature of each of the lasers 211R, 211G, and 211B and outputs a current according to the magnitude of the detected temperature. As the temperature sensor 216, for example, a variable resistance element such as a thermistor may be used. The temperature sensor 216 may include a plurality of temperature sensing elements provided for each of the lasers 211R, 211G, and 2113, or may include one temperature sensing element commonly provided for the lasers 211R, 211G, and 211B.

The buffer circuit 31 converts the current output from the optical sensor 215 to a voltage and outputs the voltage to the ADC 29. The buffer circuit 32 converts the current output from the temperature sensor 216 to a voltage and outputs the voltage to the ADC 29. The buffer circuit 33 converts the current output from the light receiving element 17 to a voltage and outputs the voltage to the ADC 29.

The ADC 29 is an AD converter that converts the analog voltage output from each of the buffer circuits 31 to 33 to a digital value and outputs the digital value to the laser control unit 27.

The main control unit 23 can control the deflection angle of a mirror (not illustrated) of the optical scanning unit 15, for example. For example, the main control unit 23 may monitor, through the buffer circuit 24, the horizontal and vertical tilt of a mirror, obtained by a horizontal displacement sensor (not illustrated) and a vertical displacement sensor (not illustrated) provided in the optical scanning unit 15, to supply an angle control signal to the mirror driving circuit 25. The mirror driving circuit 25 can drive (scan) the mirror of the optical scanning unit 15 at a predetermined angle based on the angle control signal from the main control unit 23.

The main control unit 23 can also supply a driving signal to the laser driver 26 in accordance with a digital image signal that is input from outside the control apparatus 20, for example. The main control unit 23 performs a process for separating the synchronization signal from the luminance signal and the chromaticity signal included in the input image signal. The main control unit 23 supplies a luminance signal and a chromaticity signal to the laser driver 26. An angle control signal that oscillates the mirror of the optical scanning unit 15 is generated by the main control unit 23 using a synchronization signal. The outside of the control apparatus 20 may be, for example, a personal computer or a camera module.

The laser driver 26 is a circuit that supplies a predetermined current to the lasers 211R, 211G, and 211B of the laser module 21 based on the luminance and chromaticity signals from the main control unit 23. Thus, the lasers 211R, 211G, and 211B emit red light, green light, and blue light modulated in accordance with the image signals, and these light beams are combined to form a color image corresponding to the digital image signal input from outside the control apparatus 20.

The laser driver 26 includes a number of current source circuits (in the present embodiment, three current source circuits 260R, 260G, and 260B) corresponding to the number of laser elements to drive each laser element by supplying a driving current to each laser element. The current source circuit 260R supplies a driving current to flow to the laser 211R such that the current value is adjustable, the current source circuit 260G supplies a driving current to flow to the laser 211G such that the current value is adjustable, and the current source circuit 260B supplies a driving current to flow to the laser 211B such that the current value is adjustable.

Each of the current source circuits 260R, 260G, and 260B preferably includes at least two current sources 261, 262, respectively. A driving current I1 to flow to the laser 211R is generated by the sum of a first driving current I11 generated by the first current source 261 of the current source circuit 260R and a second driving current I12 generated by the second current source 262 of the current source circuit 260R. The same applies to a driving current I2 to flow to the laser 211G and a driving current I3 to flow to the laser 211B.

The output of the light receiving element 17 (a detection value of the brightness of the external light) is input to the laser control unit 27 through a transmission cable or the like. The laser control unit 27 controls the luminance of the image viewed by the user, such as by increasing or decreasing the current values of the lasers 211R, 211G, and 211B, based on the output of the light receiving element 17.

Specifically, the laser control unit 27 monitors the brightness of the external light around the display apparatus 100 by the output of the light receiving element 17, supplies a current control signal to the laser driver 26 based on the brightness of the monitored external light, and increases or decreases the current value of each of the lasers 211R, 211G, and 211B.

The laser control unit 27 can also monitor the underlying optical output of the lasers 211R, 211G, and 211B, for example, by the output of the optical sensor 215, and supply a current control signal to the laser driver 26. The lasers 211R, 211G, and 211B are current controlled such that their respective optical outputs are predetermined optical output values based on the current control signal from the laser control unit 27. For example, a predetermined optical output value is a target value determined based on the output of the light receiving element 17, and a deviation from the determined target value is subjected to feedback control based on the output of the optical sensor 215.

The optical sensor 215 may be configured to include three sensors that independently detect the outgoing light from the lasers 211R, 211G, and 211B. Alternatively, the optical sensor 215 may include only one sensor. In this case, by sequentially causing the lasers 211R, 211G, and 211B to emit light and by sequentially detecting the light with one sensor, the outgoing light of lasers 211R, 211G, and 211B can be controlled.

The laser light output from the laser module 21 is radiated to and scanned by a mirror of the optical scanning unit 15. The laser light scanned by the mirror of the optical scanning unit 15 is directly projected onto a display surface by the optical system 500 to form an image, which allows the user to see the image of a predetermined luminance. The laser light output from the laser module 21 may be radiated directly to the mirror, or may be radiated to the mirror via an optical fiber, or may be directed to the mirror via an optical component or the like.

The laser control unit 27 may also be connected to the main control unit 23, the buffer circuit 24, the mirror driving circuit 25, and the laser driver 26 to set initial settings of these elements (setting of a range of output voltage values, etc.).

Figure 4:
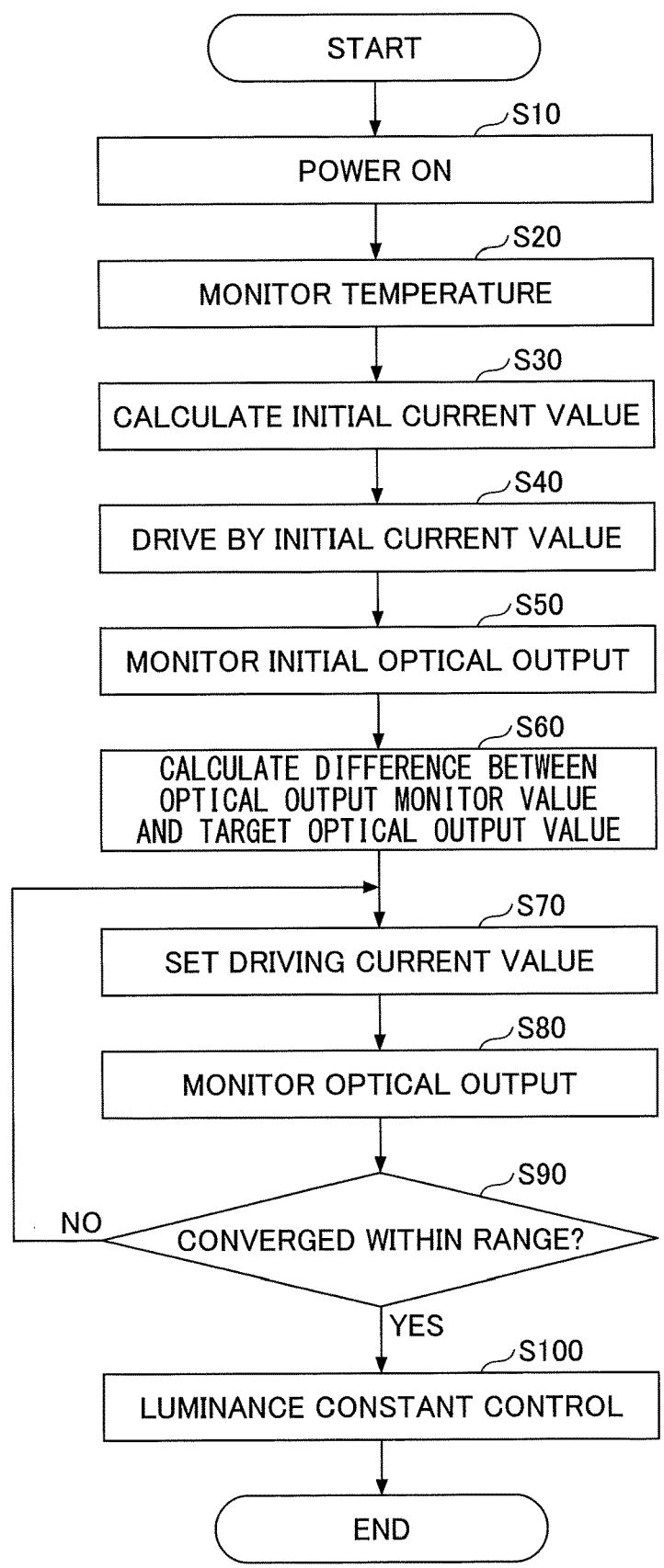
FIG. 4 is a flow chart illustrating an example of a control method according to an embodiment of the present invention.

FIG. 4 is a flow chart illustrating an example of a control method according to an embodiment of the present invention. The control method illustrated in FIG. 4 is implemented by the laser control unit 27 of the control apparatus 20 used in the display apparatus 100.

In step S10, when the power of the control apparatus 20 is turned on, the control apparatus 20 is activated.

In step S20, the laser control unit 27 monitors the temperature of the lasers 211R, 211G, and 211B by the temperature sensor 216 immediately after the control apparatus 20 is activated, and acquires temperature monitor values. That is, the laser control unit 27 acquires a monitor value of the temperature of each of the lasers 211R, 211G, and 211B detected by the temperature sensor 216 before starting the driving of the lasers 211R, 211G, and 211B.

In step S30, the laser control unit 27 determines the initial driving current value that causes the initial optical output value to be output from the laser 211R in accordance with the temperature of the laser 211R detected in step S20 by the temperature sensor 216. Similarly, the laser control unit 27 determines the initial driving current value that causes the initial optical output value to be output from the laser 211G in accordance with the temperature of the laser 211G detected in step S20 by the temperature sensor 216. Similarly, the laser control unit 27 determines the initial driving current value that causes the initial optical output value to be output from the laser 211B in accordance with the temperature of the laser 211B detected in step S20 by the temperature sensor 216.

For example, the laser control unit 27 determines an initial driving current value Io that causes the initial optical output value to be output from the laser element, based on temperature characteristic data Dc of the initial driving current value Io and the detection temperature of the laser element detected by the temperature sensor 216. The laser control unit 27 can determine a current corresponding to the temperature monitor value acquired in step S20 as the initial driving current value Io that causes the initial optical output value to be output from the laser element, based on the temperature characteristic data Dc of the initial driving current value Io.

Figure 7:
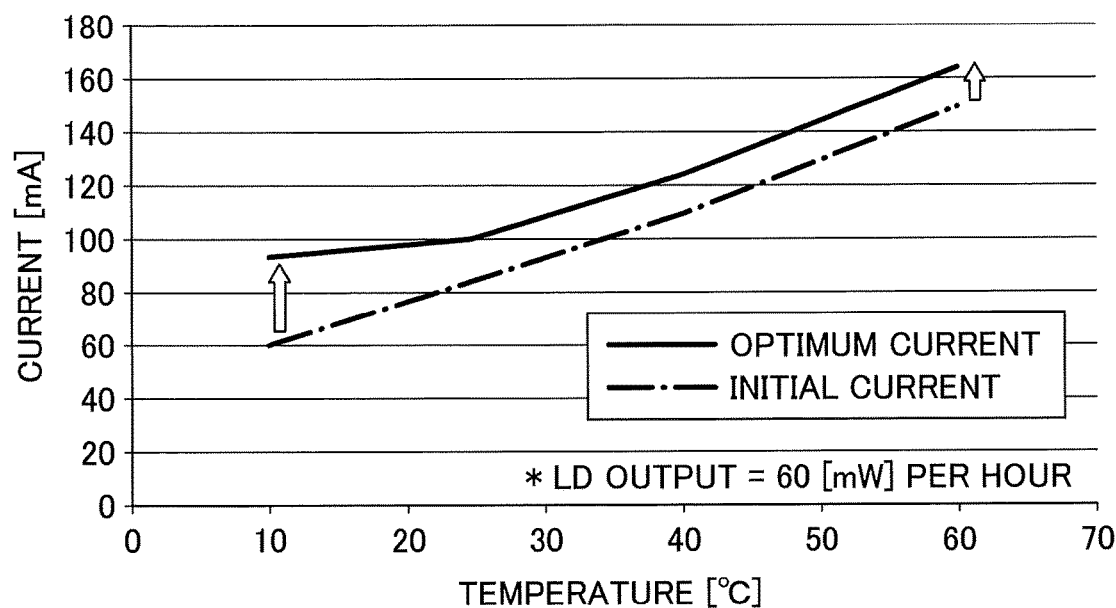
FIG. 7 is a diagram illustrating an example of a relationship between an initial driving current value for causing an initial optical output value to be output from a laser element and an optimum driving current value for causing a target optical output value to be output from a laser element.

The temperature characteristic data Dc of the initial driving current value Io is data that defines the relationship between the temperature T of the laser element and the initial driving current value Io, for example, as indicated by a dashed-dotted line of FIG. 7. Such temperature characteristic data Dc is, for example, held in advance in the memory 34 so as to be readable.

The memory 34 is preferably a rewritable memory. Even if the optical output characteristic of each laser element changes due to aging degradation or the like, the temperature characteristic data Dc held in the memory 34 is updated to accurately determine the initial driving current value Io that causes the initial optical output value to be output from each laser element.

The temperature characteristic data Dc held in advance in the memory 34 may be map data (table data) that defines the initial driving current value Io associated with each temperature of the laser element, or coefficient data of an arithmetic expression for calculating the initial driving current value Io from the temperature T of the laser element.

For example, when the arithmetic expression for calculating the initial driving current value Io from the temperature T of the laser element is a linear function represented by "Io=a×T+b" as indicated by the dashed-dotted line of FIG. 7, the pieces of data of temperature correction coefficients a and b are held in the memory 34 in advance. The laser control unit 27 can calculate the initial driving current value Io corresponding to the temperature monitor value by reading the data of the temperature correction coefficients a and b from the memory 34 and substituting the temperature monitor value acquired in step S20 to the temperature T of the above-described linear function. The arithmetic expression may be a polynomial function in which the orders are represented by two or more terms, or any other function.

In this manner, the laser control unit 27 calculates the initial driving current value Io, which causes the initial optical output value to be output from each laser element, based on the temperature of each laser element that is detected, the optical output characteristic for the injection current to each laser element, and the temperature dependence of the optical output characteristic. The laser control unit 27 controls the driving current supplied to the laser element by the laser driver 26, such that the optical output value of the laser element converges to the target optical output value Pt. Accordingly, the driving current can be changed to an appropriate initial driving current value Io in accordance with the temperature of the laser element, and the driving current to be supplied to the laser element can be initiated from such an appropriate initial driving current value Io, thereby reducing the time until the optical output value of the laser element converges to the target optical output value Pt.

In step S30, the laser control unit 27 preferably determines the initial driving current value Io to be a value lower than the driving current value It that causes the target optical output value Pt to be output from the laser element, based on the temperature characteristic data Dc and the detection temperature acquired in the previous step S20. For example, the solid line indicated in FIG. 7 represents the temperature characteristic data of the driving current value It that causes the target optical output value Pt to be output from the laser element, when the target optical output value Pt is 60 mW. That is, the solid line indicates that the driving current value It (optimum current value), required to output the target optical output value Pt from the laser element, has a temperature characteristic that changes according to the temperature T of the laser element.

FIG. 7 indicates that the laser control unit 27 determines the initial driving current value Io (dashed-dotted line) to be a value lower than the driving current value It (solid line) that causes the target optical output value Pt to be output from the laser element, based on the temperature characteristic data Dc and the detection temperature acquired in the previous step S20. Thus, it is possible to prevent the initial driving current value Io when starting to drive the laser element, from suddenly exceeding the target optical output value Pt to which the optical output of the laser element is to converge, from the start of driving, and to reduce excessive stress applied to the laser element.

As long as the initial driving current value Io is within the allowable range, in some cases, the laser control unit 27 may determine the initial driving current value Io to be a value greater than or equal to the driving current value It that causes the target optical output value Pt to be output from the laser element, based on the temperature characteristic data Dc and the detection temperature acquired in the previous step S20. This is because the laser control unit 27 controls the driving current to be supplied to the laser element by the laser driver 26, such that the optical output value of the laser element converges to the target optical output value Pt, and the driving current value begins to decrease immediately.

In step S30, the laser control unit 27 preferably determines the initial driving current value Io to be a value greater than or equal to the threshold current value Ith at which the laser element starts oscillation, based on the temperature characteristic data Dc and the detection temperature acquired in the previous step S20. Thus, compared to the case where the laser control unit 27 determines the initial driving current value Io to be a value less than the threshold current value Ith, the laser element can be started up from a current value close to the driving current value It that causes the target optical output value Pt to be output from the laser element. As a result, the time until the optical output value of the laser element converges to the target optical output value can be reduced.

In addition, the initial driving current value Io may be divided into the initial value of the threshold current value Ith (initial threshold current value Ioa) at which the laser element starts to oscillate and the initial value of the light emission current value to be added to the threshold current value Ith (initial light emission current value Iob), which is advantageous for setting the brightness gradation of the image. This is because the laser control unit 27 will be capable of independently controlling the initial threshold current value and the initial light emission current value. The light emission current value is a current value (oscillation current value) that causes the driving current value supplied to the laser element to be greater than the threshold current value Ith.

For example, the laser control unit 27 calculates the sum of the initial threshold current value Ioa determined based on the temperature characteristic of the threshold current value Ith at which the laser element starts oscillation and the initial light emission current value Iob determined based on the temperature characteristic of the light emission current value Ib to be added to the threshold current value Ith. The laser control unit 27 can determine the calculation value of this sum as the initial driving current value Io. For example, the initial threshold current value Ioa is adjusted by a first driving current generated by the first current source 261, and the initial light emission current value Iob is adjusted by a second driving current generated by the second current source 262. The sum of the first driving current and the second driving current is the driving current to be supplied to the laser element.

Figure 5:
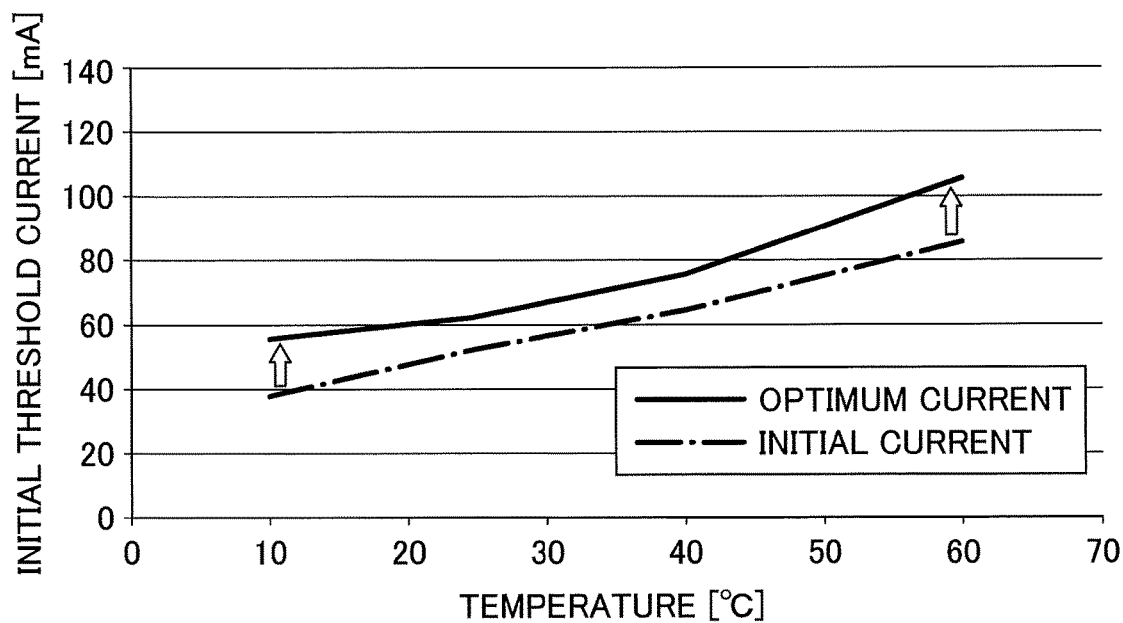
FIG. 5 is a diagram illustrating an example of a temperature characteristic of a threshold current value at which a laser element starts oscillation.
Figure 6:
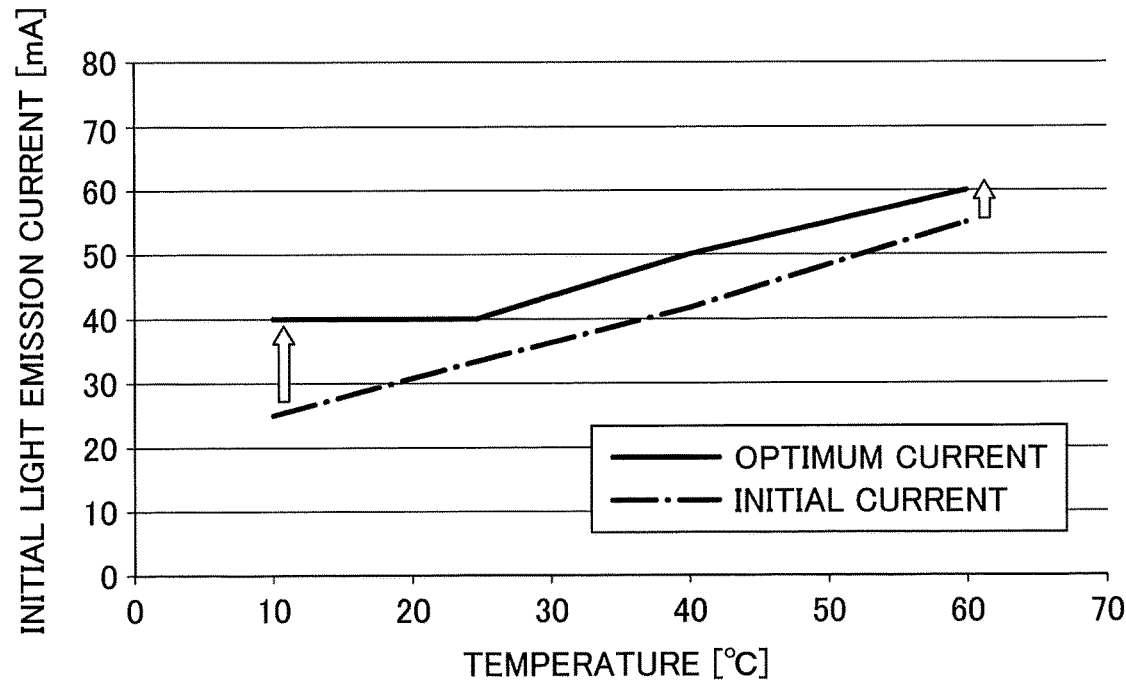
FIG. 6 is a diagram illustrating an example of a temperature characteristic of a light emission current value to be added to a threshold current value.

FIG. 5 is a diagram illustrating an example of a temperature characteristic of a threshold current value Ith at which a laser element starts oscillation. The dashed-dotted line in FIG. 5 represents an example of the temperature characteristic data Dca of the initial threshold current value Ioa that causes the initial optical output value Poa to be output from the laser element. FIG. 6 is a diagram illustrating an example of a temperature characteristic of a light emission current value Ib to be added to a threshold current value Ith. The dashed-dotted line in FIG. 6 represents an example of the temperature characteristic data Dcb of the initial light emission current value Iob that causes the initial optical output value Pob to be output from the laser element. The sum of the optimum value (optimum threshold current value) of the threshold current value Ith indicated by the solid line of FIG. 5 and the optimum value (optimum light emission current value) of the light emission current value Ib indicated by the solid line of FIG. 6, corresponds to the driving current value It indicated by the solid line of FIG. 7.

That is, the laser control unit 27 can determine the initial threshold current value Ioa based on the temperature characteristic data Dca such as the dashed-dotted line of FIG. 5, and the detection temperature in acquired step S20. The laser control unit 27 can also determine the initial light emission current value Iob based on the temperature characteristic data Dcb such as the dashed-dotted line of FIG. 6, and the detection temperature acquired in step S20. The laser control unit 27 can determine the initial driving current value Io by adding together the initial threshold current value Ioa and the initial light emission current value Iob.

The temperature characteristic data Dca of the initial threshold current value Ioa is data that defines the relationship between the temperature T of the laser element and the initial threshold current value Ioa, for example, as indicated by the dashed-dotted line of FIG. 5. The temperature characteristic data Dcb of the initial light emission current value Iob is data that defines the relationship between the temperature T of the laser element and the initial light emission current value Iob, for example, as indicated by the dashed-dotted line of FIG. 6. These pieces of temperature characteristic data are, for example, held in advance in the memory 34 so as to be readable.

Further, even if the optical output characteristic of each laser element changes due to aging degradation or the like, the pieces of temperature characteristic data Dca and Dcb held in the memory 34 are updated, so that it is possible to accurately determine the initial threshold current value Ioa and the initial light emission current value Iob.

The temperature characteristic data Dca held in advance in the memory 34 may be map data (table data) that defines the initial threshold current value Ioa associated with each temperature of the laser element or coefficient data of an arithmetic expression used for calculating the initial threshold current value Ioa from the temperature T of the laser element. The same applies to the temperature characteristic data Dcb.

For example, when the arithmetic expression for calculating the initial threshold current value Ioa from the temperature T of the laser element is a linear function represented by "Ioa=a1×T+b1" as indicated by the dashed-dotted line of FIG. 5, the pieces of data of the temperature correction coefficients a1 and b1 are held in the memory 34 in advance. The laser control unit 27 can calculate the initial threshold current value Ioa corresponding to the temperature monitor value by reading the pieces of data of the temperature correction coefficients a1 and b1 from the memory 34 and substituting the temperature monitor value acquired in step S20 to the temperature T of the above-described linear function. The calculation of the initial light emission current value Iob can also be considered in the same manner. The arithmetic expression may be a polynomial function in which the orders are represented by two or more terms, or any other function.

Thus, in step S30, the laser control unit 27 can determine the initial driving current value Io by calculating the sum of the initial threshold current value Ioa determined based on the temperature characteristic of the threshold current value Ith and the initial light emission current value Iob determined based on the temperature characteristic of the light emission current value Ib.

In step S40, the laser control unit 27 starts (initiates) the driving current to be supplied to each laser element by the laser driver 26, from the initial driving current value Io determined in step S30. For example, the laser control unit 27 controls the current sources 261 and 262 such that the driving current to be supplied from the laser driver 26 to each laser element starts from the initial driving current value Io calculated in step S30. The laser control unit 27 controls the laser driver 26 such that the driving of each laser element is started from the initial driving current value Io calculated in step S30, thereby starting the oscillation of each laser element and initiating the light emission.

This light emission occurs in a non-display area other than the display area of the image to be displayed by the display apparatus 100. The laser control unit 27 displays, for example, the light (reference light) output from each laser element by supplying the initial driving current value Io to each laser element in step S40 in a non-display area located in at least one of the upper, lower, left, and right areas outside the frame of the display area.

In step S50, the laser control unit 27 monitors the output of the optical sensor 215 that receives the light when the reference light is emitted and acquires the optical output monitor value of each laser element. That is, the laser control unit 27 starts the driving current from the initial driving current value Io, and then monitors the output of the optical sensor 215 to acquire the optical output monitor value of each laser element.

In step S60, the laser control unit 27 compares the optical output monitor value acquired in step S50 immediately after starting the driving by the initial driving current value Io with the target optical output value Pt defined in advance, and calculates the difference between these two values. In step S70, the laser control unit 27 sets the driving current value to be supplied to each laser element by the laser driver 26, such that the above-described difference is reduced. In step S80, the laser control unit 27 acquires the optical output monitor value of each laser element by monitoring the output of the optical sensor 215 when each laser element is driven at the driving current value set in step S70.

In step S90, the laser control unit 27 determines whether the difference Δ between the optical output monitor value acquired in step S80 and the target optical output value Pt defined in advance has converged within a predetermined range. When it is determined that the difference Δ has not converged within a predetermined range, the laser control unit 27 resets the driving current value so that the difference Δ is reduced (step S70). Then, the laser control unit 27 acquires the optical output monitor value when each laser element is driven at the driving current value set in step S70 (step S80), and performs the determination processing in step S90.

That is, the laser control unit 27 controls the driving current of the laser element such that after starting the driving current of the laser element from the initial driving current value Io, the difference between the optical output monitor value of the laser element obtained by monitoring the output of the optical sensor 215 and the target optical output value Pt is reduced. The laser control unit 27 repeats the processing of steps S70 to S90 until the difference converges within a predetermined range. The laser control unit 27 executes such repetitive processing, for example, by PI control or PID control (P: Proportional, I: Integral, D: Differential).

In step S90, when the laser control unit 27 determines that the difference Δ between the optical output monitor value acquired in step S80 and the target optical output value Pt defined in advance has converged within a predetermined range, the laser control unit 27 executes the process of step S100.

In step S100, when the difference Δ has converged within a predetermined range, the laser control unit 27 controls the driving current of the laser element based on the output of the light receiving element 17 that detects the external light around the display apparatus 100, such that the luminance of the image displayed by the display apparatus 100 is constant. Thus, an image of a constant luminance can be provided to the user even when the brightness around the display apparatus 100 changes. In addition, after activation of the display apparatus 100, the optical output value of each laser element quickly converges to the target optical output value Pt, and, therefore, an image of a constant luminance can be quickly provided to the user.

Here, in step S30, the laser control unit 27 may correct the initial driving current value Io, which causes the initial optical output value to be output from each laser element, in accordance with at least one of the accumulated light emission time Ta of each laser element and the accumulated optical output Pa of each laser element. By performing such correction, it is possible to accurately determine the initial driving current value Io that causes the initial optical output value to be output from each laser element, even when the optical output characteristic of each laser element changes due to aging degradation or the like.

Figure 8:
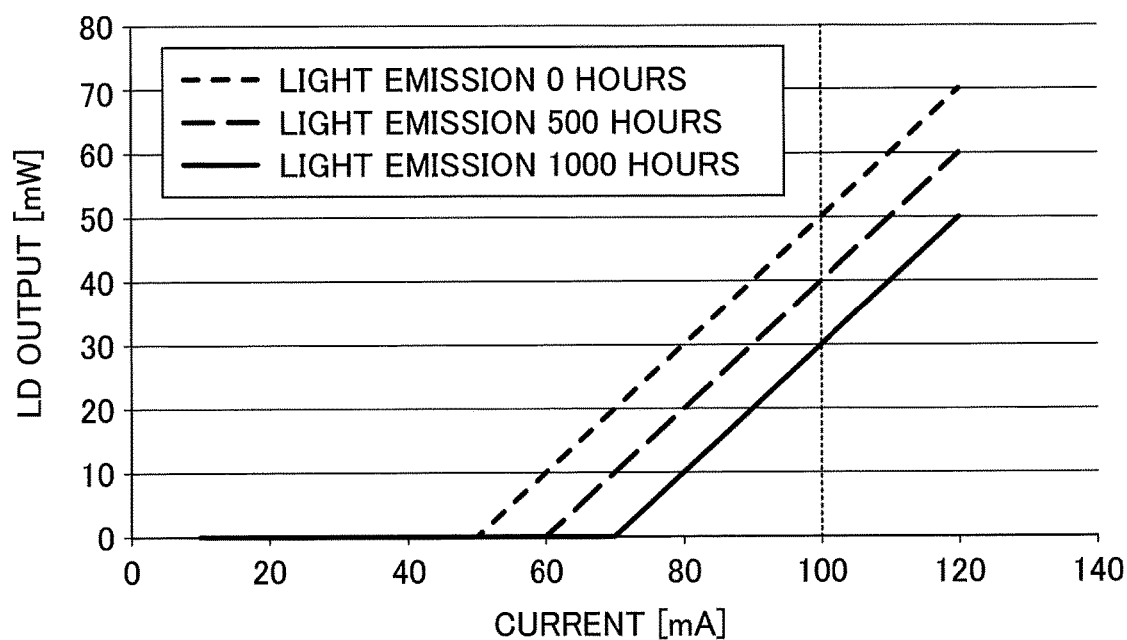
FIG. 8 is a diagram illustrating an example of a characteristic in which a threshold current value of a laser element changes with the accumulated light emission time.
Figure 9:
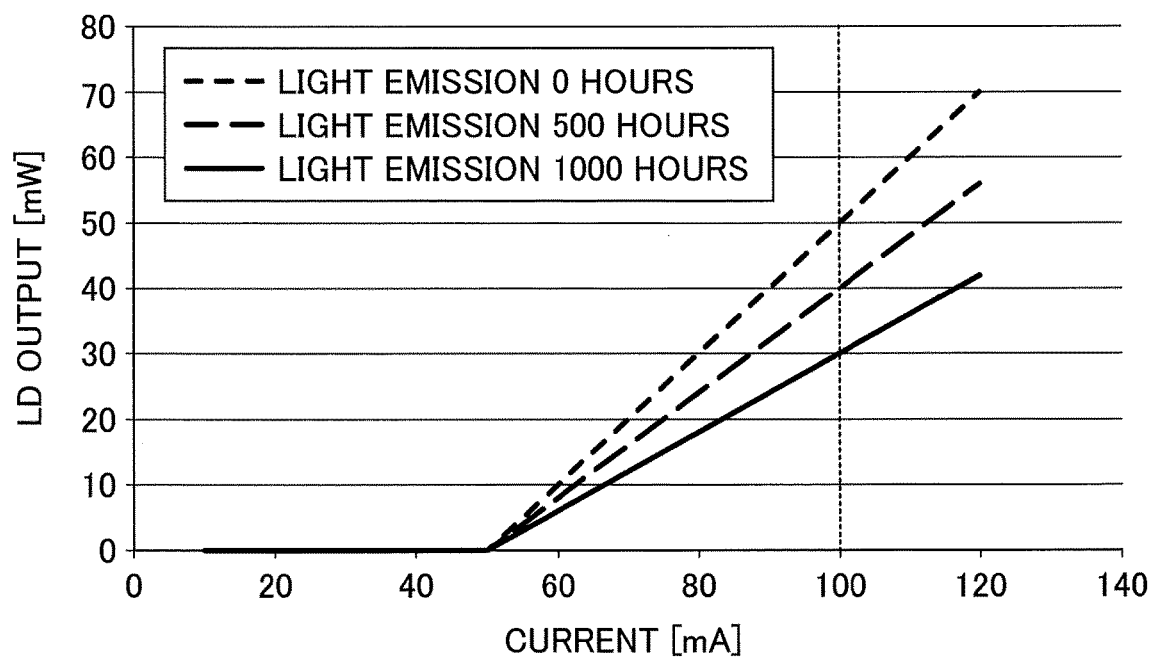
FIG. 9 is a diagram illustrating an example of a characteristic in which the light emission efficiency of a laser element changes with the accumulated light emission time.

There are two major types of aging degradation of laser elements; that is, a case where the threshold current value Ith until oscillation increases as the accumulated light emission time Ta increases (FIG. 8), and a case when the slope (light emission efficiency) of the optical output relative to the injection current decreases as the accumulated light emission time Ta increases (FIG. 9). Accordingly, typically, the laser control unit 27 can quickly cause the optical output to converge to the target optical output value Pt, by performing correction to increase the initial driving current value Io, as the accumulated light emission time Ta or the accumulated optical output Pa of each laser element increases.

For example, the laser control unit 27 measures the light emission time of each laser element by a timer and records the accumulated value of the light emission time as the accumulated light emission time Ta in the memory 34. The laser control unit 27 detects the optical output of each laser element by the optical sensor 215 and records the accumulated value of the optical output as the accumulated optical output Pa in the memory 34. When at least one of the accumulated light emission time Ta and the accumulated optical output Pa exceeds a predetermined threshold, the laser control unit 27 corrects the initial driving current value Io. Accordingly, correction of the initial driving current value Io can be performed at an appropriate timing.

The laser control unit 27 may correct the initial driving current value Io by multiplying the initial driving current value Io by at least one of the correction coefficient α set in accordance with the value of the accumulated light emission time Ta and the correction coefficient β set in accordance with the value of the accumulated optical output Pa. The correction coefficients α and β are, for example, non-negative values. The laser control unit 27 can adjust the increase or decrease of the initial driving current value Io by changing the setting values of the correction coefficients α and β. That is, the initial driving current value Io can be corrected.

The laser control unit 27 may correct the temperature characteristic data Dc of the initial driving current value Io in accordance with at least one of the accumulated light emission time Ta and the accumulated optical output Pa. For example, the laser control unit 27 can correct the temperature characteristic data Dc by multiplying the above-described temperature correction coefficients a and b by at least one of a correction coefficient τa set in accordance with the value of the accumulated light emission time Ta and a correction coefficient τb set in accordance with the value of the accumulated optical output Pa. The correction coefficients τa and τb are, for example, non-negative values. The laser control unit 27 can correct the temperature characteristic data Dc by changing the setting values of the correction coefficients τa and τb. The laser control unit 27 can correct the initial driving current value Io by determining the initial driving current value Io using the corrected temperature characteristic data Dc. The laser control unit 27 can update the temperature characteristic data Dc held in advance in the memory 34 by recording the corrected temperature characteristic data Dc in the memory 34. As a result, the laser control unit 27 can determine the initial driving current value Io at the time of starting driving from the next time and onwards by using the updated temperature characteristic data Dc. Therefore, even if the optical output characteristic of each laser element changes due to aging degradation, etc., the laser control unit 27 can continuously derive an accurate initial driving current value Io even from the next time and onwards.

For example, the laser control unit 27 continuously acquires data on the optical output characteristic (including the temperature characteristic of the optical output) of the laser element while performing an operation to control the driving current of the laser element based on the output of the light receiving element 17 so that the luminance of the image becomes constant. The laser control unit 27 may determine a correction coefficient (e.g., correction coefficients τa and τb) to correct the temperature characteristic data Dc based on the data of these continuously acquired optical output characteristics.

For example, the laser control unit 27 may correct the temperature characteristic data Dc when the difference between the optical output monitor value of the laser element obtained by monitoring the output of the optical sensor 215 and the target optical output value Pt is calculated to be greater than a predetermined value, when the driving current is started from the initial driving current value Io. By performing such correction, even when the difference gradually increases due to aging degradation in the output characteristic of the laser element, correction of the temperature characteristic data Dc can be performed at an appropriate timing.

The above-described method for correcting the initial driving current value Io is also applicable to the case where the initial threshold current value Ioa and the initial light emission current value Iob are respectively corrected. The above-described method for correcting the temperature characteristic data Dc is also applicable to the case where the temperature characteristic data Dca of the initial threshold current value Ioa and the temperature characteristic data Dcb of the initial light emission current value Iob are respectively corrected.

As described above, according to an embodiment of the present invention, the optical output can be quickly stabilized immediately after the image display apparatus is activated, and in particular, the brightness and color can be stabilized, regardless of the temperature of the surrounding environment or aging degradation of the laser element.

In addition, there may be cases where the reference light emitted outside the image display area cannot be shielded, and, therefore, it is preferable to implement control in a short time. Furthermore, immediately after startup, the temperature of the environment is particularly susceptible to change and the optical output of the laser element is greatly changed, compared to the case of continuous operation. Therefore, it is necessary to quickly implement the optical output control for this reason also.

Figure 2:
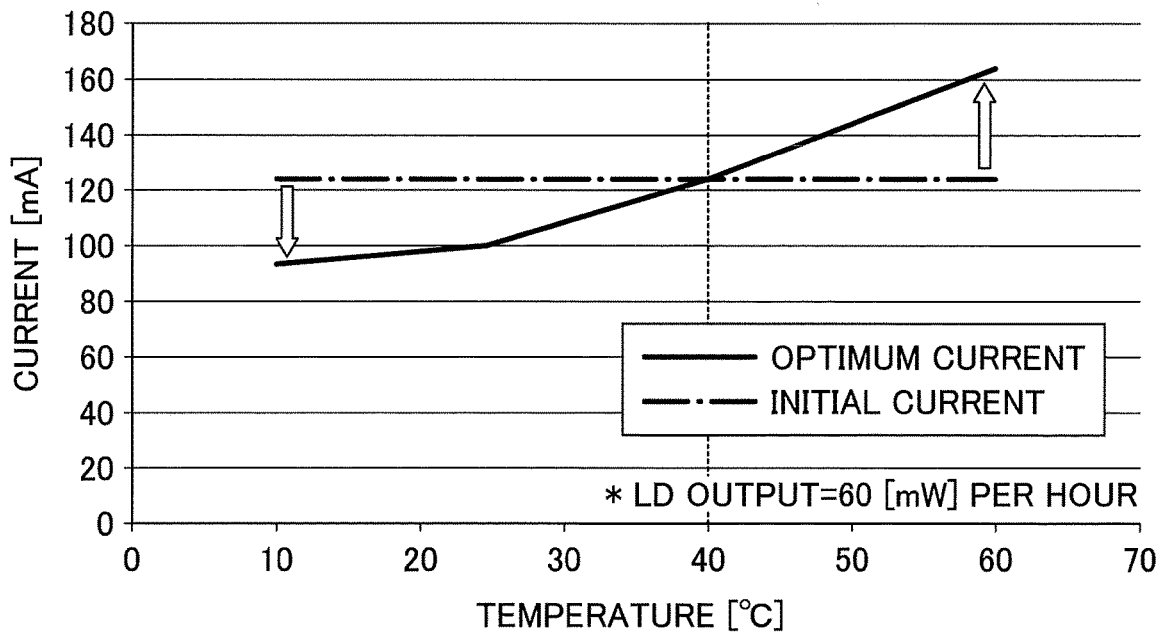
FIG. 2 is a diagram illustrating a relationship between a fixed initial driving current value and an optimum current value for outputting a desired optical output value from a laser element, derived from the characteristic of FIG. 1.

By using the techniques of an embodiment of the present invention, it is possible to adjust the driving current value of the laser element in accordance with the environmental temperature and laser change. Compared to the case where the driving starts with the fixed initial driving current value illustrated in FIG. 2, in the case where the driving starts with the initial driving current value Io that is variable according to the temperature illustrated in FIG. 7, the optical output of the laser element immediately after the startup becomes closer to the target optical output value Pt. Therefore, the subsequent control amount of the optical output can be reduced, and the control is quickly completed.

The functions of the main control unit 23 and the laser control unit 27 are implemented, for example, as a processor operates according to a program that is readably stored in a memory. The processor is, for example, a central processing unit (CPU).

According to each of the embodiments described above, the driving current can be changed to an appropriate initial driving current value according to the temperature of the laser element, and the driving current flowing to the laser element can be started from such an appropriate initial drive current value, thereby reducing the time until the optical output value of the laser element converges to the target optical output value.

Although the control apparatus, the optical scanning apparatus, the display apparatus, and the control method described above have been described in accordance with embodiments, the present invention is not limited to the above-described embodiments. Various modifications and improvements, such as combinations and substitutions with some or all of the other embodiments, may be made within the scope of the present invention.

For example, in the above-described embodiment, an example of applying the control apparatus according to an embodiment of the present invention to a laser scanning display apparatus is indicated. However, this is an example, and the disclosed control apparatus is also applicable to equipment other than the display apparatus. Such equipment may include, for example, a laser printer, a laser scanning hair remover, a laser head lamp, a laser radar, and the like.

What is claimed is:

1. A control apparatus used in a display apparatus, the control apparatus comprising:
   a laser element;
   a temperature sensor configured to detect a temperature of the laser element;
   a laser driver configured to drive the laser element; and
   a laser control unit configured to control a driving current to be supplied to the laser element by the laser driver, such that an optical output value of the laser element converges to a target optical output value, wherein
   the laser control unit
      determines an initial driving current value that causes an initial optical output value to be output from the laser element, based on temperature characteristic data of the initial driving current value, and a detection temperature of the laser element detected by the temperature sensor, and
      controls the driving current to start from the determined initial driving current value.

2. The control apparatus according to claim 1, wherein the laser control unit controls the driving current such that a difference between an optical output monitor value of the laser element, obtained by monitoring an output of an optical sensor, and the target optical output value becomes small, after the driving current is started from the initial driving current value.

3. The control apparatus according to claim 2, wherein the laser control unit controls the driving current, based on an output of a light receiving element configured to detect external light around the display apparatus, such that a luminance of an image displayed by the display apparatus becomes constant, upon detecting that the difference has converged within a predetermined range.

4. The control apparatus according to claim 1, wherein the laser control unit determines the initial driving current value to be a value lower than a driving current value that causes the target optical output value to be output from the laser element, based on the temperature characteristic data and the detection temperature.

5. The control apparatus according to claim 1, wherein the laser control unit determines the initial driving current value to be a value that is greater than or equal to a threshold current value at which the laser element starts oscillation, based on the temperature characteristic data and the detection temperature.

6. The control apparatus according to claim 1, wherein the laser control unit corrects the initial driving current value, according to at least one of an accumulated light emission time of the laser element and an accumulated optical output of the laser element.

7. The control apparatus according to claim 6, wherein the laser control unit corrects the initial driving current value, upon detecting that at least one of the accumulated light emission time and the accumulated optical output exceeds a predetermined threshold.

8. The control apparatus according to claim 6, wherein the laser control unit corrects the temperature characteristic data, according to at least one of the accumulated light emission time and the accumulated optical output.

9. The control apparatus according to claim 1, wherein the laser control unit corrects the temperature characteristic data, upon detecting that a difference between an optical output monitor value of the laser element, obtained by monitoring an output of an optical sensor, and the target optical output value, is calculated to be exceeding a predetermined value, when the driving current is started from the initial driving current value.

10. The control apparatus according to claim 1, further comprising:
a memory configured to hold, in advance, the temperature characteristic data, wherein
the laser control unit reads the temperature characteristic data from the memory to determine the initial driving current value.

11. The control apparatus according to claim 10, wherein the laser control unit
corrects the temperature characteristic data, according to at least one of an accumulated light emission time of the laser element and an accumulated optical output of the laser element,
updates the temperature characteristic data held in the memory to the corrected temperature characteristic data, and
determines the initial driving current value to be used from a next time and onwards by using the updated temperature characteristic data.

12. The control apparatus according to claim 1, wherein the laser control unit determines the initial driving current value by calculating a sum of an initial threshold current value and an initial light emission current value, the initial threshold current value being determined based on a temperature characteristic of a threshold current value at which the laser element starts oscillation, and the initial light emission current value being determined based on a temperature characteristic of a light emission current value to be added to the threshold current value.

13. An optical scanning apparatus comprising:
the control apparatus according to claim 1; and
an optical scanning unit configured to scan a laser light output from the laser element.

14. A display apparatus comprising:
the optical scanning apparatus according to claim 13; and
an optical system configured to project an image based on the laser light scanned by the optical scanning unit.

15. A control method for controlling a driving current to be supplied to a laser element, such that an optical output value of the laser element converges to a target optical output value, the control method comprising:
determining an initial driving current value that causes an initial optical output value to be output from the laser element, based on temperature characteristic data of the initial driving current value, and a detection temperature of the laser element that is detected; and
controlling the driving current to start from the determined initial driving current value.

* * * * *